(12) United States Patent
Lance et al.

(10) Patent No.: US 6,375,054 B1
(45) Date of Patent: Apr. 23, 2002

(54) VEHICLE MOUNTED STORAGE UNIT

(76) Inventors: Marshall Lance, 523 N. First St., Geneva, IL (US) 60134; Sandra Lance, 1088 Center Dr., South Elgin, IL (US) 60177

( * ) Notice: Subject to any disclaimer, the term of this patent is extended or adjusted under 35 U.S.C. 154(b) by 0 days.

(21) Appl. No.: 09/621,770

(22) Filed: Jul. 21, 2000

(51) Int. Cl.⁷ ................................................. B60R 7/00
(52) U.S. Cl. ...................... 224/404; 224/547; 224/557; 296/37.6
(58) Field of Search .................... 224/404, 403, 224/547, 557; 296/37.6

(56) References Cited

U.S. PATENT DOCUMENTS

| | | |
|---|---|---|
| 3,826,529 A | 7/1974 | Wood |
| 4,085,961 A | 4/1978 | Brown |
| 4,249,684 A * | 2/1981 | Miller et al. ............... 224/42.4 |
| 4,469,364 A | 9/1984 | Rafi-Zadeh |
| 4,573,731 A | 3/1986 | Knaack et al. |
| 4,728,017 A * | 3/1988 | Mullican .................. 224/42.42 |
| 4,752,095 A * | 6/1988 | Brady ........................ 296/37.6 |
| 4,789,195 A | 12/1988 | Fletcher |
| 4,889,377 A | 12/1989 | Hughes |
| D305,315 S | 1/1990 | Fletcher |
| 4,898,284 A | 2/1990 | Arens |
| 4,971,234 A | 11/1990 | Hay |
| 5,015,025 A | 5/1991 | Henriquez |
| 5,076,630 A | 12/1991 | Henriquez |
| 5,088,636 A * | 2/1992 | Barajas ....................... 224/281 |
| 5,121,306 A | 6/1992 | Palmisano |
| 5,232,259 A | 8/1993 | Booker |
| 5,395,019 A | 3/1995 | Christensen |
| 5,398,987 A | 3/1995 | Sturgis |
| 5,588,631 A * | 12/1996 | Yee ............................. 248/553 |
| 5,743,584 A | 4/1998 | Lance et al. |
| 5,779,047 A | 7/1998 | Darrah |
| 5,964,492 A | 10/1999 | Lyon |
| 5,988,473 A * | 11/1999 | Hagan et al. ................ 224/404 |

OTHER PUBLICATIONS

Snap–On Tools Catalog, 1982, 298 pages, date unknown.
Hand–numbered documents 1–44, date unknown.
Hand–numbered documents 47–72, date unknown.
Hand–numbered documents 101–140, date unknown.

* cited by examiner

Primary Examiner—Stephen K. Cronin
(74) Attorney, Agent, or Firm—Marshall, Gerstein & Borun

(57) ABSTRACT

A vehicle mounted storage unit adapted to be mounted to a rear floor portion of a vehicle, such as a pickup truck, may be provided with a mounting structure and a cabinet mounted to the mounting structure. The storage unit may be provided with a plurality of drawers disposed in the cabinet and positioned within the cabinet between a pair of cabinet sidewalls, each of the drawers being movable in a direction parallel to the width of the cabinet. The storage unit may have a cover operatively connected to the cabinet, the cover being movable between an open position in which the drawers may be opened and a closed position in which the cover prevents the drawers from being opened, and a cover latch associated with the cover that allows the cover to be latched in its closed position.

17 Claims, 7 Drawing Sheets

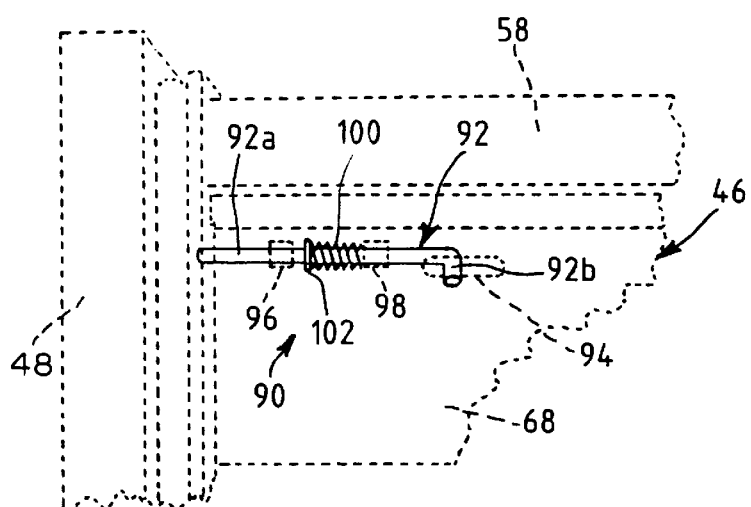
FIG. 9
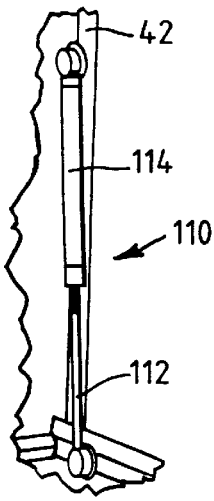
FIG. 12
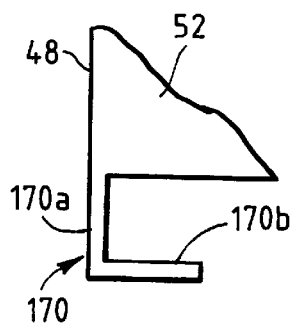
FIG. 10
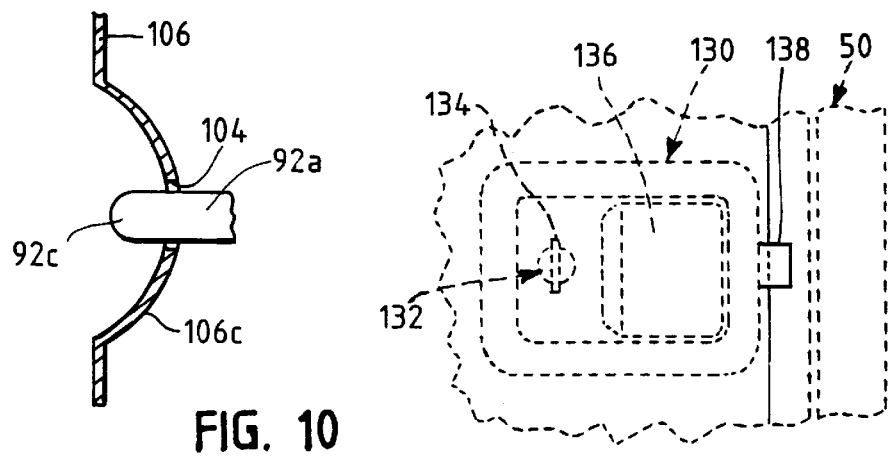
FIG. 13
FIG. 11
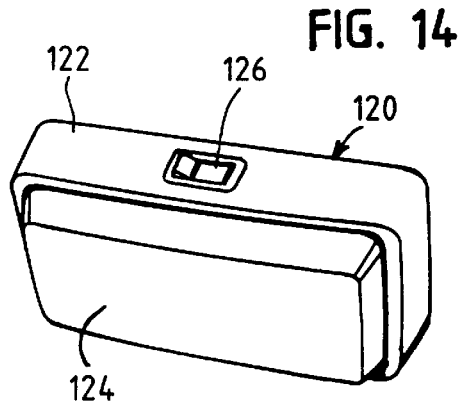
FIG. 14

VEHICLE MOUNTED STORAGE UNIT

BACKGROUND OF THE INVENTION

The present invention is directed to a vehicle mounted storage unit.

U.S. Pat. No. 5,121,306 to Palmisano discloses a tool compartment mounted to the rear floor portion of a pickup truck. The tool compartment is mounted to the floor portion of the pickup truck at a mounting position disposed just behind and adjacent to the cab of the pickup truck. The tool compartment is shown to have a length that is substantially the same as the distance between the two sidewalls of the pickup truck so that the tool compartment extends the entire distance between the two sidewalls of the pickup truck.

U.S. Pat. No. 5,232,259 to Booker discloses a toolbox mounted to a rear floor portion of a pickup truck at a mounting point adjacent the tailgate of the pickup truck. The side of the toolbox disposed adjacent the tailgate has a relatively large height and the opposite side of the toolbox has a relatively small height, and the top side of the toolbox is angled so that it increases in height towards the tailgate and so that the top side of the tailgate acts as an air deflector.

U.S. Pat. No. 5,964,492 to Lyon discloses a storage receptacle for a pickup truck bed. The storage receptacle is shaped like a box and slidably mounted to the rear portion of the pickup truck. The storage receptacle is provided with a hinged cover that has a first portion that is generally horizontal when the cover is in a closed position and a second portion that is generally vertical when the cover is in an open position. The cover is supported in its open position by a counterweighting air cylinder attached between a sidewall of the storage receptacle and the cover.

SUMMARY OF THE INVENTION

The present invention is directed to a storage unit structured to be mounted to a rear floor portion of a vehicle, such as a pickup truck, having a rearwardly facing cab wall, a first vehicle sidewall, a first wheel well having a portion which extends outwardly from a portion of the first vehicle sidewall, a second vehicle sidewall, and a second wheel well having a portion which extends outwardly from a portion of the second vehicle sidewall.

The vehicle mounted storage unit may be provided with a mounting structure shaped to be capable of being mounted to the rear floor portion of the vehicle and a cabinet shaped to be capable of being mounted to the mounting structure. The cabinet may be provided with a length of at least about three feet, a width of at least about eighteen inches, and a height of at least about sixteen inches.

The cabinet may include a first cabinet sidewall spaced from the first vehicle sidewall by at least about four inches in a direction perpendicular to the first cabinet sidewall when the cabinet is mounted to the vehicle, a second cabinet sidewall spaced from the first cabinet sidewall by at least about three feet in a direction parallel to the length of cabinet and spaced from the second vehicle sidewall by at least about four inches in a direction perpendicular to the second cabinet sidewall when the cabinet is mounted to the vehicle, a rear cabinet member connected to the first and second cabinet sidewalls, and a cabinet floor member connected to the first and second cabinet sidewalls, the cabinet floor member being shaped to facilitate attachment of the cabinet floor member to the mounting structure.

The storage unit may be provided with a plurality of drawers disposed in the cabinet and positioned within the cabinet between the first cabinet side wall and the second cabinet sidewall, each of the drawers being movable in a direction parallel to the width of the cabinet.

Each of the drawers may be provided with a first drawer sidewall, a second drawer sidewall spaced from the first drawer sidewall by at least about two feet in a direction parallel to the length of the cabinet, and a front drawer wall connected to the first and second drawer sidewalls of the first drawer. The front drawer wall may be provided with a first side that is spaced from the first sidewall of the vehicle by at least about eight inches when the cabinet is mounted to the vehicle and a second side that is spaced from the second sidewall of the vehicle by at least about eight inches when the cabinet is mounted to the vehicle.

The storage unit may also be provided with one or more one drawer support members that support each of the drawers so that each drawer is movable in a direction parallel to the width of the cabinet between an open position and a closed position. The storage unit may also have a drawer latch associated with each drawer, each drawer latch being movable between a first position in which the drawer latch prevents the drawer from being opened and a second position in which the drawer latch allows the drawer to be opened.

The storage unit may have a cover operatively connected to the cabinet, the cover being movable between an open position in which the drawers may be opened and a closed position in which the cover prevents the drawers from being opened, and a cover latch associated with the cover that allows the cover to be latched in its closed position.

The mounting structure of the storage unit may be provided with a mounting body having a plurality of holes formed therein to facilitate attachment of the mounting body to the rear floor portion of the vehicle, a first flange that extends outwardly from a first side of the mounting body and that is vertically spaced from the rear floor portion of the vehicle by a first distance to define a first flange space, and a second flange that extends outwardly from a second side of the mounting body and that is vertically spaced from the rear floor portion of the vehicle by a second distance to define a second flange space.

The cabinet may be provided with a first mounting flange that is sized to fit within the first flange space disposed between the rear floor portion of the vehicle and the first flange of the mounting structure and a second mounting flange spaced from the first mounting flange in a direction parallel to the length of the cabinet, the second mounting flange being sized to fit within the second flange space disposed between the rear floor portion of the vehicle and the second flange of the mounting structure.

The features and advantages of the present invention will be apparent to those of ordinary skill in the art in view of the detailed description of the preferred embodiment, which is made with reference to the drawings, a brief description of which is provided below.

BRIEF DESCRIPTION OF THE DRAWINGS

FIG. 9 illustrates an embodiment of a drawer latch that can be used to secure a drawer in its closed position;

FIG. 10 is a top view of a portion of the storage unit shown partly in cross section;

FIG. 11 illustrates one of the flange members of the cabinet of the storage unit;

FIG. 12 illustrates an actuator that facilitates opening of the cover of the storage unit;

FIG. 13 illustrates a cover latch that may be used to latch the cover of the storage unit in its closed position; and FIG. 14 illustrates a lamp that may be mounted to the underside of the cover of the storage unit for illuminating the interior of the storage unit.

DETAILED DESCRIPTION OF VARIOUS EMBODIMENTS

Figure 1:
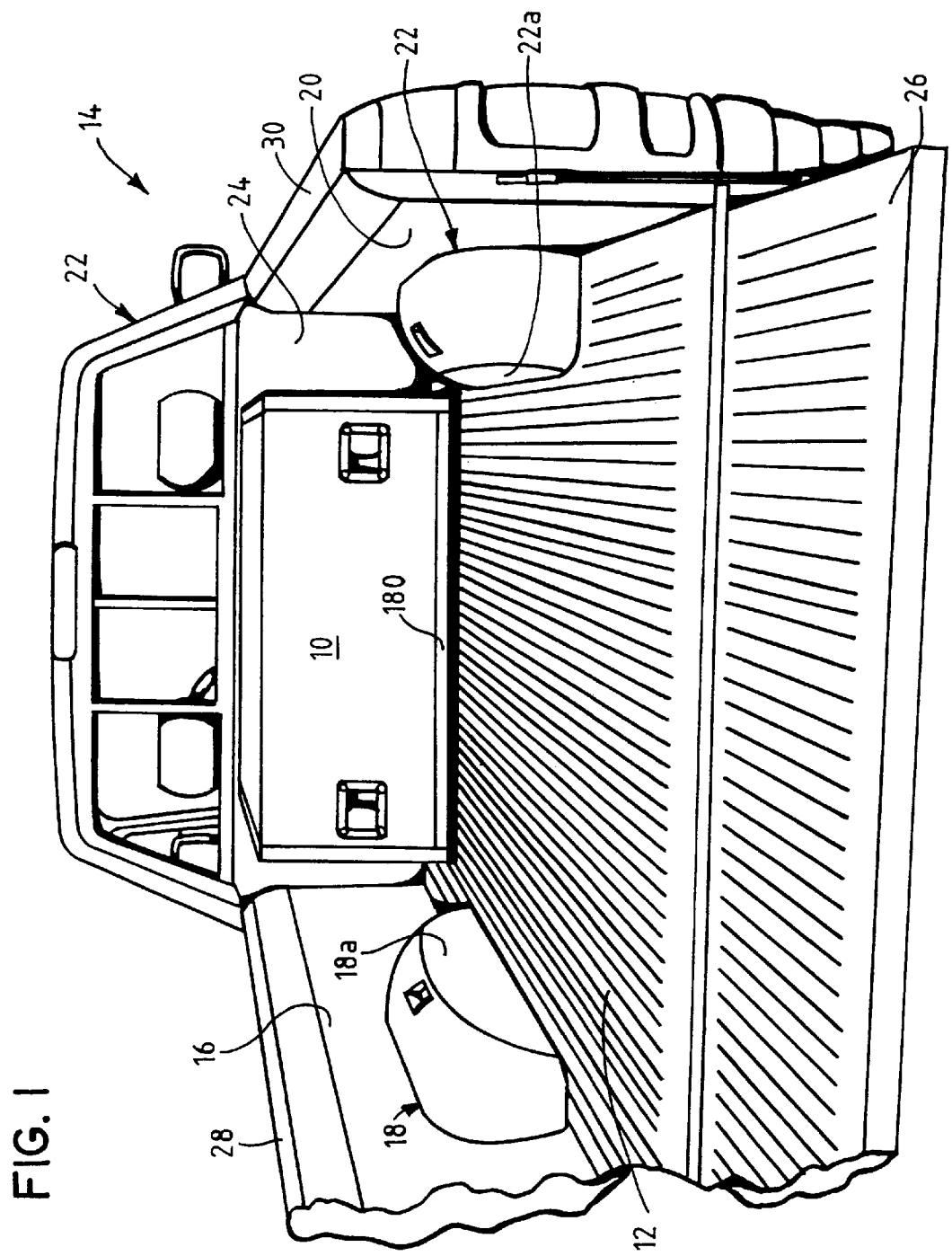
FIG. 1 is a perspective view of an embodiment of a storage unit in accordance with the invention mounted to the rear bed of a pickup truck.

FIG. 1 illustrates one embodiment of a storage unit 10 in accordance with the invention shown mounted to the rear floor portion or bed 12 of a pickup truck 14. The pickup truck 14 is provided with a left sidewall 16, a left wheel well 18 that extends outwardly from the left sidewall 16, a right sidewall 20, and a right wheel well 22 that extends outwardly from the right sidewall 20. The pickup truck 14 is also provided with a cab 22 for the driver and one or more passengers, a rearwardly facing cab wall 24, and a tailgate 26 that is pivotally connected to the rear end of the truck bed 12. The sidewalls 16, 20 have respective top portions or surfaces 28, 30. While the following description is made with reference to a pickup truck 14, the storage unit 10 could be mounted to other vehicles, such as vans that have internal wheel wells like those shown in FIG. 1.

The storage unit 10 may be provided with a length of between about three feet and about four feet, a width of between about twelve inches and about thirty inches, and a height of between about fifteen inches and about twenty four inches. The height of the storage unit 10 may be made no greater than about twenty inches, which is the approximate distance that the sidewalls 16, 20 extend above the bed 12 of the pickup truck 14.

The distance between the interior faces of the two vehicle sidewalls 16, 20, taken in a direction perpendicular to the sidewalls 16, 20, may range from about 50 inches to about 70 inches, and the distance between a pair of interior portions or faces 18a, 22a of the wheel wells 18, 22 taken in that same direction (i.e. the wheel-well-to-wheel-well distance) may range from about 40 inches to about 50 inches. The storage unit 10 may be provided with a length that is no greater than the wheel-well-to-wheel-well distance.

FIG. 1 shows the storage unit 10 mounted immediately adjacent the rear cab wall 24 of the pickup truck 14 so that the storage unit 10 is disposed equidistant between the left and right vehicle sidewalls 16, 20 and so that the length of the storage unit 10 is disposed in a direction parallel to the rear cab wall 24 and perpendicular to a pair of planes coinciding with the sidewalls 16, 20. When the storage unit 10 is so mounted, due to the length of the storage unit 10 being less than the sidewall-to-sidewall distance noted above, there may be a space or gap of between about four inches to about ten inches between each of the sidewalls and a respective one of the sides of the storage unit 10.

Figure 2:
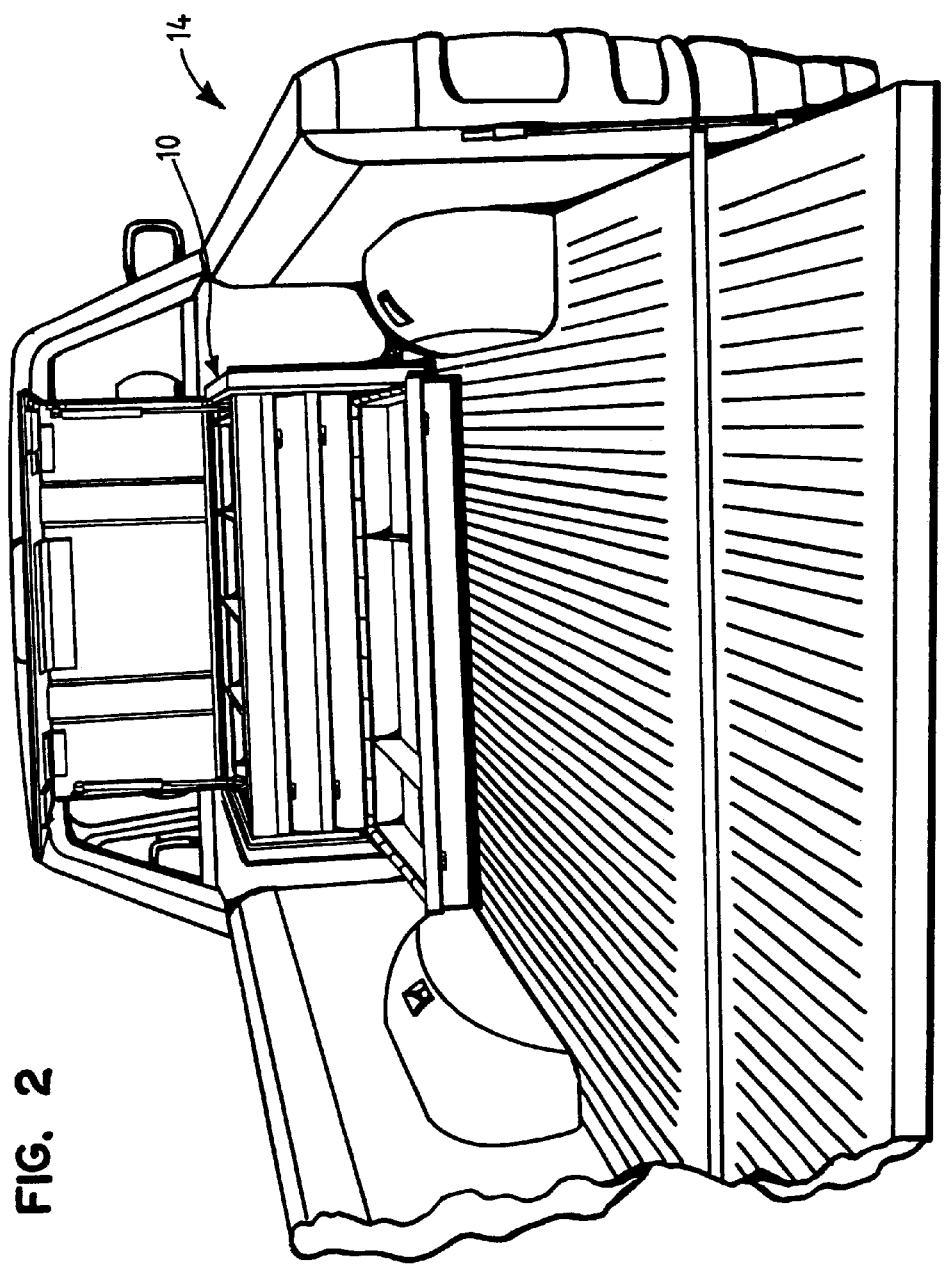
FIG. 2 illustrates the storage unit of FIG. 1 with its cover and one of its drawers open.
Figure 3:
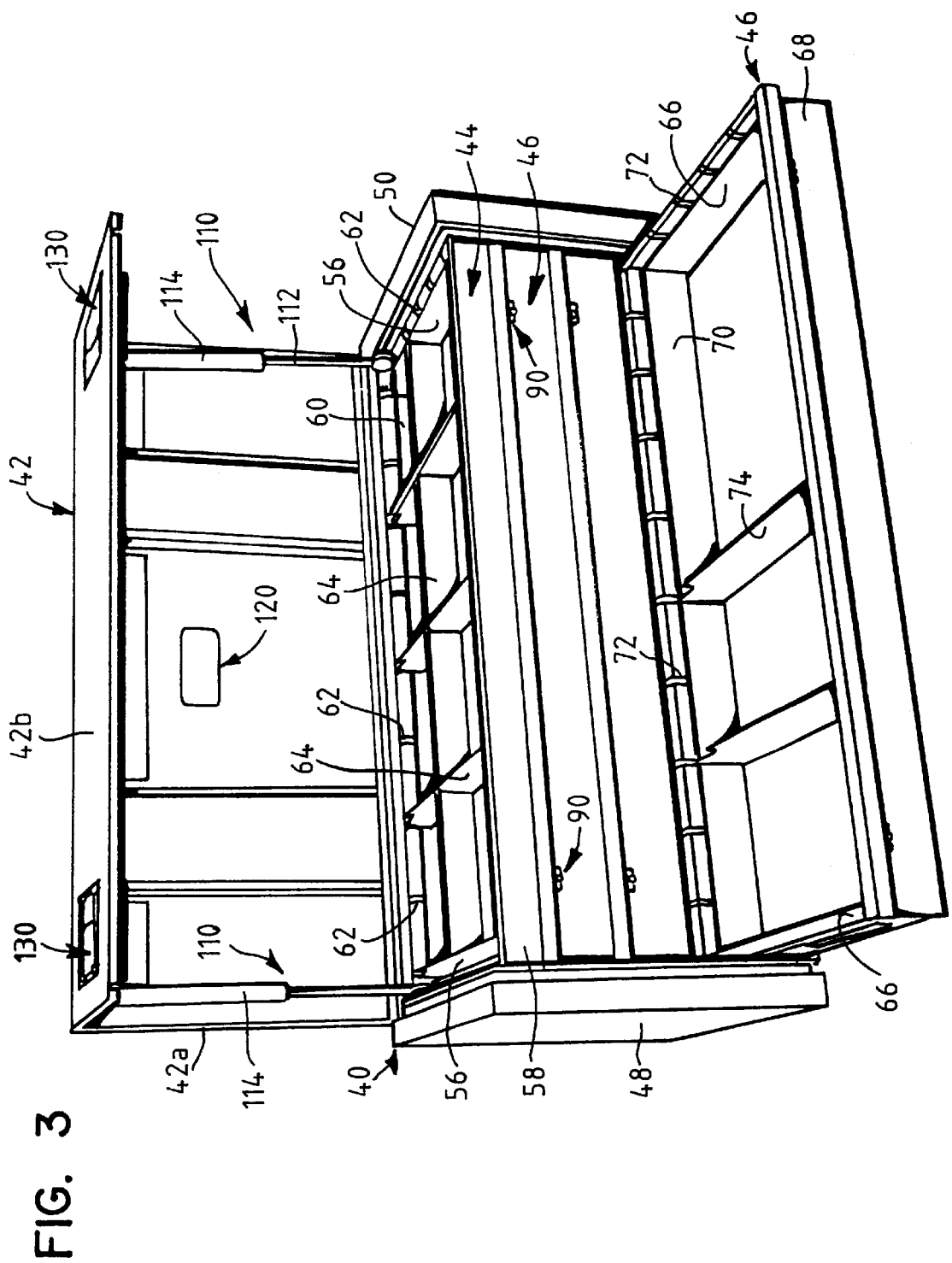
FIG. 3 is a perspective view of the storage unit of FIG. 1 with its cover open and one of its drawers open.

Referring to FIGS. 2 and 3, the storage unit 10 may be provided with a box-shaped cabinet 40, a cover 42 pivotally connected to the cabinet 40, a fixed top tray 44, and a plurality of slidable drawers 46. The cabinet 40 may be provided with a first sidewall 48, a second sidewall 50, a rear cabinet member 52 (FIG. 6), such as a flat wall portion, and a cabinet floor member 54 (FIG. 6), such as a flat base portion. The cabinet 40, the cover 42 and other parts of the storage unit 10 may be composed of steel, and the cabinet 40 and the cover 42 may be provided with a patterned surface having diamond-shaped raised areas for strength and/or durability.

Referring to FIG. 3, the top tray 44 may be provided with a pair of tray sidewalls 56 spaced apart by a distance ranging from about 30 inches to about 48 inches. The top tray 44 may be provided with a front wall 58 and a rear wall 60. The tray walls 56, 58, 60 may have a plurality of spaced-apart slots 62 formed therein, with each of the slots 62 sized to receive one end of a tray divider 64. The tray dividers 64 may have slots (not shown) formed therein to facilitate division of the top tray 44 into various sized rectangular storage areas via tray dividers 64 oriented in a direction parallel to the length of the cabinet 40 and tray dividers 64 oriented in a direction perpendicular to the length of the cabinet 40.

Each of the drawers 46 may be provided with a pair of drawer sidewalls 66 spaced apart by a distance ranging from about 30 inches to about 48 inches. Each drawer 46 may be provided with a front wall 68 and a rear wall 70. The drawer walls 66, 68, 70 may have a plurality of spaced-apart slots 72 formed therein, with each of the slots 72 sized to receive one end of a drawer divider 74. The drawer dividers 74 may have slots (not shown) formed therein to facilitate division of each drawer 46 into various sized rectangular storage areas via drawer dividers 74 oriented in a direction parallel to the length of the cabinet 40 and drawer dividers 74 oriented in a direction perpendicular to the length of the cabinet 40.

Figure 7:
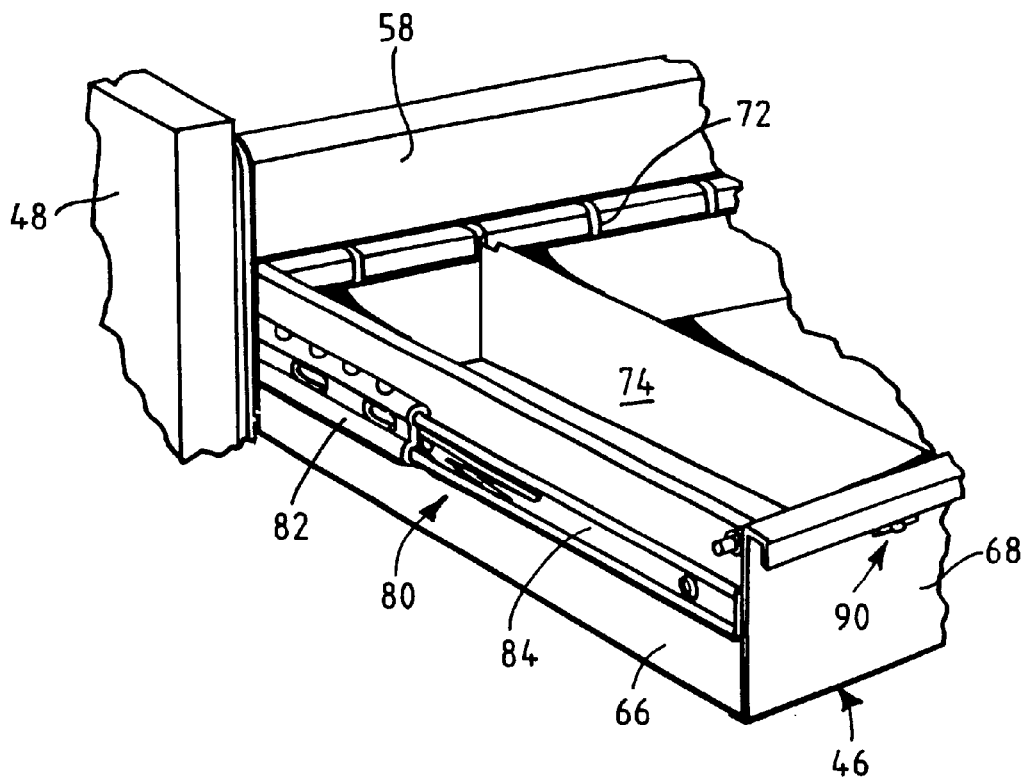
FIG. 7 is a perspective view of a portion of one of the drawers of the storage unit.
Figure 8:
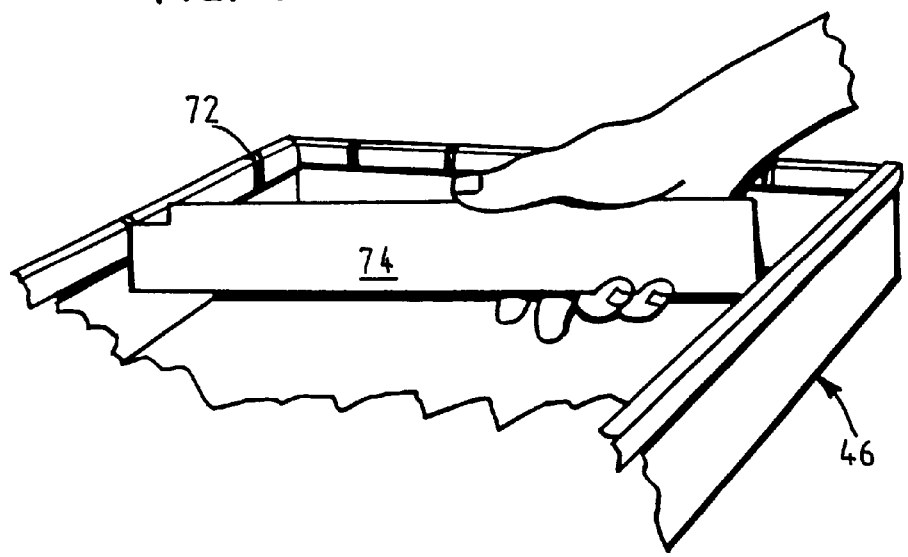
FIG. 8 is a perspective view of a portion of one of the drawers of the storage unit illustrating the insertion of a drawer divider.

Referring to FIG. 7, each of the drawers 46 may be provided with a pair of conventional drawer support assemblies 80 that slidably support the drawer 46 between a closed position in which the drawer 46 is disposed within the cabinet 40 and an open position in which the drawer 46 extends outwardly from the cabinet 40. Each drawer support assembly 80 may be composed of an outer support member 82 slidably connected to the cabinet 40 and an inner support member 84 that is fixed to one side of the drawer 46 and slidably retractable into the outer support member 82. The drawers 46 may be provided with conventional drawer stop structures that prevent the drawers 46 from being pulled outwardly by more than a predetermined extent.

Referring to FIGS. 3 and 9, each of the drawers 46 may be provided with one or more latch assemblies 90 to maintain the the drawers 46 in a secured position when the pickup truck 14 is in motion. One of the latch assemblies 90 may be operatively connected to each end of each of the drawers 46. FIG. 9 shows an embodiment of one of the latch assemblies 90 to include an L-shaped latch rod 92 having a long portion 92a and a short portion 92b that extends through a slot 94 formed in the front face of the drawer 46 (shown in phantom). The latch rod 92 may be translatably journalled by a pair of support members 96, 98, each of which has a hole (not shown) through which the rod 92 passes. The rod 92 may pass through a spring 100, and a stop member 102 having a diameter or width larger than that of the spring 100 may be fixed to the rod 92. The diameter of the spring 100 may be larger than the hole (not shown) in the support member 98 through which the rod 92 passes so that the spring 100 is trapped or captured between the stop member 102 and the support member 98.

In the position shown in FIG. 9, the spring 100 exerts a spring force against both the support member 98 and the stop member 102 to force the rod 92 to the left, which causes the end 92c of the rod portion 92a to be disposed in a hole 104 (FIG. 10) formed in an interior wall 106 of the cabinet 40. When the rod 92 in that position, the drawer 46 may not be opened.

When the short portion 92b of the rod 92 is grasped and forced to travel to the right within the slot 94, the end 92c of the rod portion 92a will be moved out of the hole 104 in the interior wall 106, and the drawer 46 may be opened. When the rod 92 is released with the drawer 46 in its open position, the spring 100 will force the rod 92 back to its position shown in FIG. 9.

Referring to FIG. 10, the interior wall 106 of the cabinet 40 may be provided with an angled or curved portion 106a, and the rod 92 may be provided with a rounded end 92c, so that the user does not have to manually move the latch rod 92 in order to close the drawer 46. In that case, when the drawer 46 is closed, the angled or curved portion 106a will automatically cause the rod 92 to be pushed to the right against the force of the spring 100. Then, when the end 92c of the rod 92 becomes aligned with the hole 104, the spring 100 will force the end 92c of the rod 92 to move into the hole 104 to prevent the drawer 46 from being opened again.

As shown in FIG. 3, the cover 42 may be provided as an L-shaped member having a top cover portion 42a and a front cover portion 42b disposed perpendicular to the top cover portion 42a. Referring to FIGS. 3 and 12, opening and closing the cover 42 may be assisted by one or more support assemblies 110, which may be provided as gas-filled shock absorbers having a piston rod 112 having an attached piston (not shown) slidingly disposed in a gas-filled cylinder 114. The support assemblies 110 may be mounted so that closing of the cover 42 causes the pistons to compress the gas within the cylinder 114, and so that the opening of the cover 42 is assisted by decompression of the gas, thus effectively reducing the perceived weight of the cover 42 upon its being opened and closed. The support assemblies 110 may also be designed to support the cover 42 in its open position as shown in FIG. 3.

Referring to FIGS. 3 and 14, a battery-operated lamp assembly 120 may be mounted to the underside of the top cover portion 42a. As shown in FIG. 14, the lamp assembly 120 may include a lamp housing 122 in which a light bulb (not shown) and one or more batteries (not shown) are disposed, a clear or translucent globe 124 that allows light to pass through, and switch 126 for turning the light bulb on and off.

Referring to FIGS. 3 and 13, the front cover portion 42b may have one or more opening latches 130 formed therein. Referring to FIG. 13, an embodiment of one of the latches 130 may be provided with a locking mechanism 132 with a keyhole 134, a pivotable handle 136, and a latch member 138. Locking the latch 130 via the keyhole 134 may prevent the handle 136 from pivoting when it is pulled outwardly. With the latch 130 unlocked, pulling the handle 136 outwardly may cause the latch member 138 to retract (move to the right in FIG. 13) or be removed from a slot (not shown) formed in a portion of the cabinet sidewall 50 to allow the cover 42 to be opened.

Figure 4:
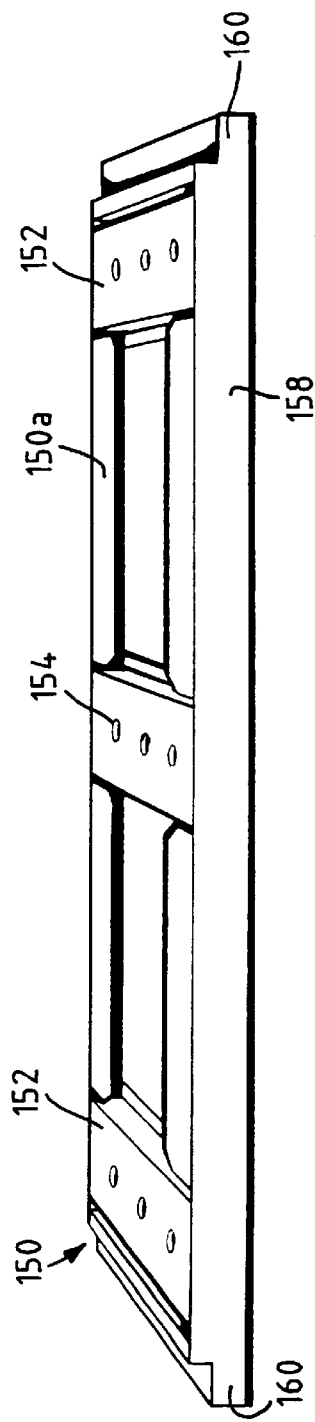
FIG. 4 is a perspective view of a structure for mounting the storage unit to the pickup truck with the bottom side of the mounting structure facing upwards.
Figure 5:
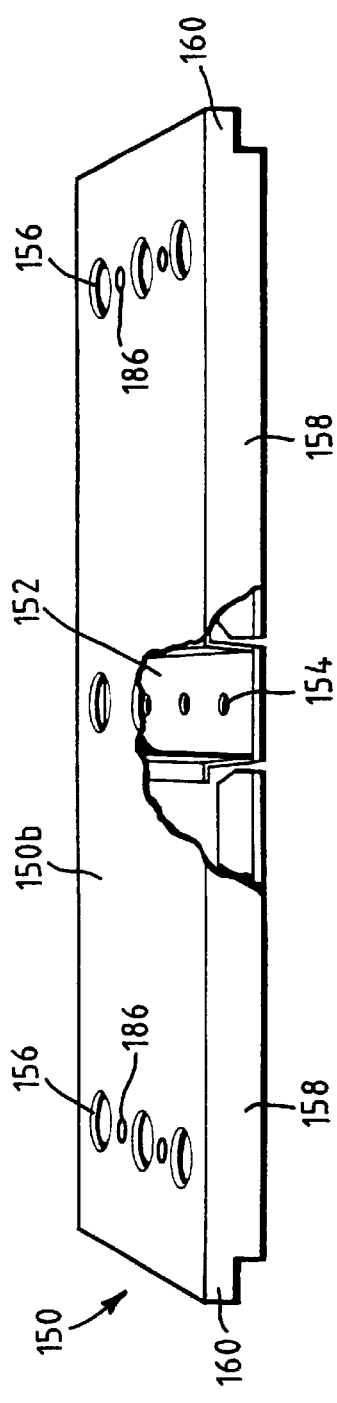
FIG. 5 is a perspective view of the mounting structure of FIG. 4 with the top side of the mounting structure facing upwards.

FIGS. 4 and 5 illustrate a mounting structure or bracket 150 that may be used to facilitate mounting of the cabinet 40 to the bed 12 of the pickup truck 14. Referring to FIGS. 4 and 5, the mounting bracket 150 has a bottom side 150a having three panel portions 152 each of which has three relatively small-diameter holes 154 formed therein. The mounting bracket 150 has a top side 150b having three rows of three relatively large-diameter holes 156 formed therein. The mounting bracket 150 has a central body portion 158 and a pair of flanges 160 each of which extends outwardly from a respective side of the central body portion 158 and each of which is vertically spaced from the bed 12 of the pickup truck 14 by a distance to define a first flange space when the mounting bracket 150 is mounted to the bed 12 with its top surface 150b facing upwards.

Figure 6:
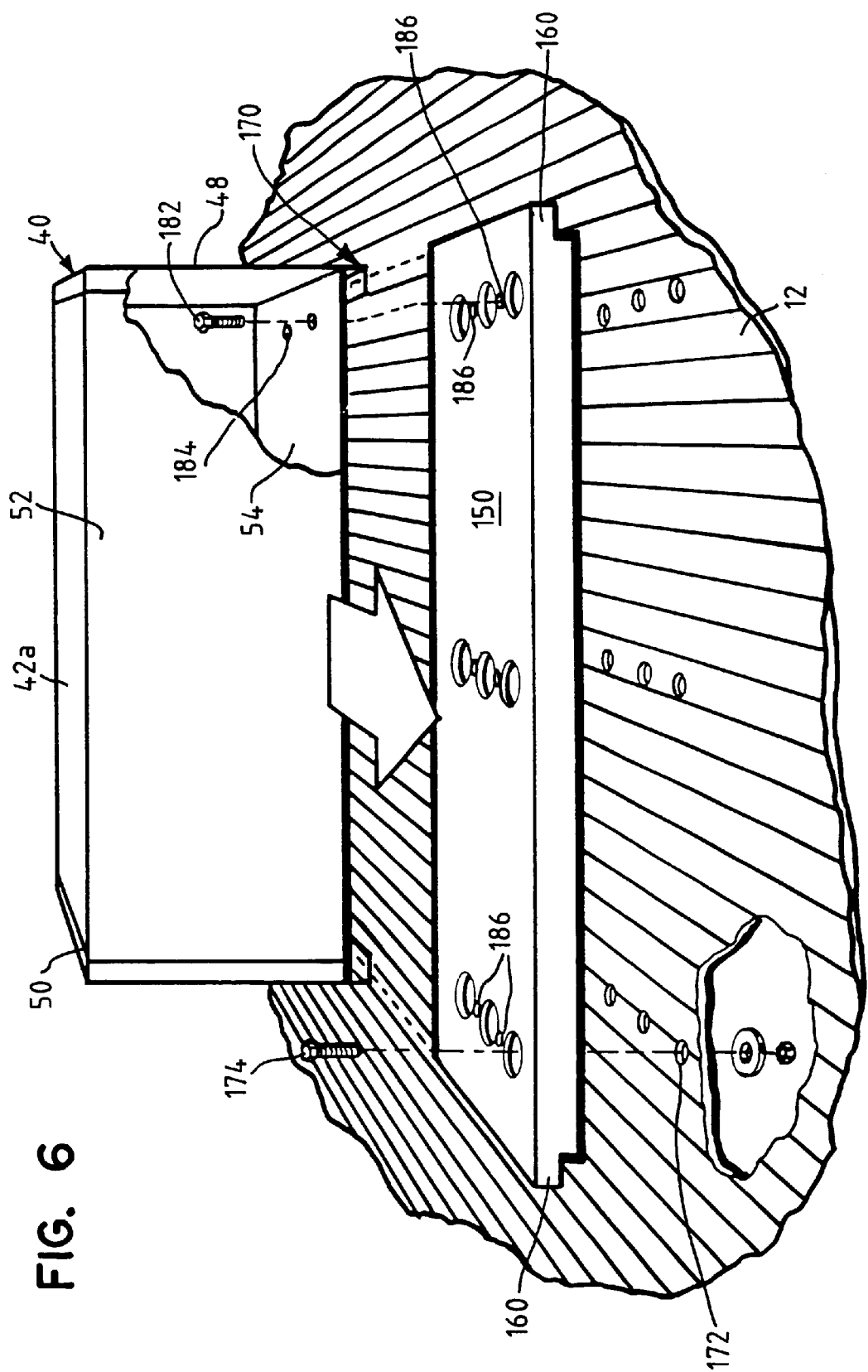
FIG. 6 is an exploded perspective view illustrating how the storage unit may be mounted to the bed of the pickup truck.

Referring to FIGS. 6 and 11, each lower side of the cabinet 40 may be provided with a respective mounting flange 170 that extends the entire width of the cabinet 40. As shown in FIG. 11, each mounting flange 170 may have a vertical flange portion 170a generally coincident with one of the sidewalls 48, 50 of the cabinet 40 and a horizontal flange portion 170b. The horizontal portion 170b of each of the flanges 170 attached to the cabinet 40 may be sized to fit within a respective one of the flange spaces formed between the flanges 160 of the mounting bracket 160 and the bed 12 when the bracket 150 is mounted to the bed 12.

Referring to FIG. 6, which shows the rear of the cabinet 40 viewed from the pickup truck cab 22, the storage unit 10 may be mounted to the pickup truck bed 12 by first drilling a plurality of holes 172 in the pickup truck bed 12, then by fastening the mounting bracket 150 to the bed 12 with a plurality of bolts 174 that pass through the holes 154 in the mounting bracket 150 and the holes 172 in the bed 12.

With the mounting bracket 150 so mounted, the cabinet 40 may be slid onto the mounting bracket 150, with the rear wall 52 of the cabinet 40 facing the cab 22, so that the flange portions 170b connected to the lower sides of the cabinet 40 are positioned in the flange spaces between the flanges 160 of the mounting bracket 150 and the bed 12. The cabinet 40 may be slid relative to the mounting bracket 150 until either a lower front portion 180 (FIG. 1) of the cabinet 40 makes contact with the mounting bracket 150 or until the cabinet 40 makes contact with the cab wall 24 (FIG. 1).

With the cabinet 40 disposed in the desired position, the cabinet 40 may be connected to the mounting bracket 150 via a plurality of bolts 182 that pass through a plurality of holes 184 formed in the floor portion 54 of the cabinet 40 and through a plurality of holes 186 formed in the mounting bracket 150, the holes 186 being of relatively small diameter and being positioned between the large-diameter holes 156.

Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A vehicle mounted storage unit mounted to a rear floor portion of a vehicle having a rearwardly facing cab wall, a first vehicle sidewall, a first wheel well having a portion which extends outwardly from a portion of said first vehicle sidewall, a second vehicle sidewall, a second wheel well having a portion which extends outwardly from a portion of said second vehicle sidewall, said vehicle mounted storage unit being mounted to said vehicle at a mounting point adjacent said cab wall and disposed substantially equally between said first and second vehicle sidewalls, said vehicle mounted storage unit comprising:

a mounting structure mounted to said rear floor portion of said vehicle, said mounting structure comprising:
   a mounting body having a plurality of holes formed therein to facilitate attachment of said mounting body to said rear floor portion of said vehicle;
   a first flange that extends outwardly from a first side of said mounting body, said first flange being vertically spaced from said rear floor portion of said vehicle by a first distance to define a first flange space; and
   a second flange that extends outwardly from a second side of said mounting body, said second flange being vertically spaced from said rear floor portion of said vehicle by a second distance to define a second flange space;

a cabinet mounted to said mounting structure, said cabinet having a length of at least about three feet, a width of at least about twelve inches, and a height of at least about fifteen inches, said cabinet comprising:
   a first cabinet sidewall that is spaced from said first vehicle sidewall by at least about four inches in a direction perpendicular to said first cabinet sidewall;
   a second cabinet sidewall spaced from said first cabinet sidewall by at least about three feet in a direction parallel to said length of cabinet, said second cabinet sidewall being spaced from said second vehicle sidewall by at least about four inches in a direction perpendicular to said second cabinet sidewall;
   a rear cabinet member connected to said first and second cabinet sidewalls;
   a cabinet floor member connected to said first and second cabinet sidewalls, said cabinet floor member having a plurality of holes formed therein to facilitate attachment of said cabinet floor member to said mounting body of said mounting structure;
   a first mounting flange that is sized to fit within said first flange space disposed between said rear floor portion of said vehicle and said first flange of said mounting structure; and
   a second mounting flange spaced from said first mounting flange in a direction parallel to said length of said cabinet, said second mounting flange being sized to fit within said second flange space disposed between said rear floor portion of said vehicle and said second flange of said mounting structure;

a first drawer disposed in said cabinet, said first drawer being positioned within said cabinet between said first cabinet side wall and said second cabinet sidewall, said first drawer being movable in a direction parallel to said width of said cabinet, said first drawer comprising:
   a first drawer sidewall;
   a second drawer sidewall spaced from said first drawer sidewall of said first drawer by at least about two feet in a direction parallel to said length of said cabinet; and
   a front drawer wall connected to said first and second drawer sidewalls of said first drawer, said front drawer wall of said first drawer having a first side that is spaced from said first sidewall of said vehicle by at least about eight inches and a second side that is spaced from said second sidewall of said vehicle by at least about eight inches;

at least one first drawer support member that supports said first drawer, said first drawer support member supporting said first drawer so that said first drawer is movable in a direction parallel to said width of said cabinet between an open position and a closed position;

a first drawer latch associated with said first drawer, said first drawer latch being movable between a first position in which said first drawer latch prevents said first drawer from being opened and a second position in which said first drawer latch allows said first drawer to be opened;

a second drawer disposed in said cabinet and positioned below said first drawer, said second drawer being positioned within said cabinet between said first cabinet side wall and said second cabinet sidewall, said second drawer being movable in a direction parallel to said width of said cabinet, said second drawer comprising:
   a first drawer sidewall;
   a second drawer sidewall spaced from said first drawer sidewall of said second drawer by at least about two feet in a direction parallel to said length of said cabinet; and
   a front drawer wall connected to said first and second drawer sidewalls of said second drawer, said front drawer wall of said second drawer having a first side that is spaced from said first sidewall of said vehicle by at least about eight inches and a second side that is spaced from said second sidewall of said vehicle by at least about eight inches;

at least one second drawer support member that supports said second drawer, said second drawer support member supporting said second drawer so that said second drawer is movable in a direction parallel to said width of said cabinet between an open position and a closed position;

a second drawer latch associated with said second drawer, said second drawer latch being movable between a first position in which said second drawer latch prevents said second drawer from being opened and a second position in which said second drawer latch allows said second drawer to be opened;

a cover operatively connected to said cabinet, said cover comprising a first cover portion and a second cover portion that is perpendicular to said first cover portion, said cover being movable between an open position in which said first and second drawers may be opened and a closed position in which said cover prevents said first and second drawers from being opened; and a cover latch associated with said cover, said cover latch allowing said cover to be latched in its closed position.

2. A vehicle mounted storage unit as recited in claim 1 wherein said rear cabinet member comprises a rear cabinet wall.

3. A vehicle mounted storage unit as recited in claim 1 wherein said first distance is substantially equal to said second distance.

4. A vehicle mounted storage unit as recited in claim 1 wherein each of said first and second drawer latches comprises:
   a movable latching member; and
   a spring operatively coupled to said latching member that biases said latching member in a latching position in which one of said drawers is prevented from being opened.

5. A vehicle mounted storage unit as recited in claim 1 additionally comprising a pair of cover support assemblies that cause said cover to be retained in its open position.

6. A vehicle mounted storage unit mounted to a rear floor portion of a vehicle having a rearwardly facing cab wall, a first vehicle sidewall, a first wheel well having a portion which extends outwardly from a portion of said first vehicle sidewall, a second vehicle sidewall, a second wheel well having a portion which extends outwardly from a portion of said second vehicle sidewall, said vehicle mounted storage unit being mounted to said vehicle at a mounting point disposed substantially equally between said first and second vehicle sidewalls, said vehicle mounted storage unit comprising:
- a cabinet mounted to said rear floor portion of said vehicle, said cabinet having a length of at least about three feet, a width of at least about twelve inches, and a height of at least about fifteen inches, said cabinet comprising:
  - a first cabinet sidewall that is spaced from said first vehicle sidewall by at least about four inches in a direction perpendicular to said first cabinet sidewall;
  - a second cabinet sidewall spaced from said first sidewall by at least about three feet in a direction parallel to said length of cabinet, said second cabinet sidewall being spaced from said second vehicle sidewall by at least about four inches in a direction perpendicular to said second cabinet sidewall;
  - a rear cabinet member connected to said first and second cabinet sidewalls; and
  - a cabinet floor member connected to said first and second cabinet sidewalls, said cabinet floor member being shaped to facilitate attachment of said cabinet floor member to said mounting structure;
- a first drawer disposed in said cabinet, said first drawer being positioned within said cabinet between said first cabinet side wall and said second cabinet sidewall, said first drawer being movable in a direction parallel to said width of said cabinet, said first drawer comprising:
  - a first drawer sidewall;
  - a second drawer sidewall spaced from said first drawer sidewall of said first drawer by at least about two feet in a direction parallel to said length of said cabinet; and
  - a front drawer wall connected to said first and second drawer sidewalls of said first drawer, said front drawer wall of said first drawer having a first side that is spaced from said first sidewall of said vehicle by at least about eight inches and a second side that is spaced from said second sidewall of said vehicle by at least about eight inches;
- at least one first drawer support member that supports said first drawer, said first drawer support member supporting said first drawer so that said first drawer is movable in a direction parallel to said width of said cabinet between an open position and a closed position;
- a first drawer latch associated with said first drawer, said first drawer latch being movable between a first position in which said first drawer latch prevents said first drawer from being opened and a second position in which said first drawer latch allows said first drawer to be opened;
- a second drawer disposed in said cabinet and positioned below said first drawer, said second drawer being positioned within said cabinet between said first cabinet side wall and said second cabinet sidewall, said second drawer being movable in a direction parallel to said width of said cabinet, said second drawer comprising:
  - a first drawer sidewall;
  - a second drawer sidewall spaced from said first drawer sidewall of said second drawer in a direction parallel to said length of said cabinet; and
  - a front drawer wall connected to said first and second drawer sidewalls of said second drawer, said front drawer wall of said second drawer having a first side that is spaced from said first sidewall of said vehicle by at least about eight inches and a second side that is spaced from said second sidewall of said vehicle by at least about eight inches;
- at least one second drawer support member that supports said second drawer, said second drawer support member supporting said second drawer so that said second drawer is movable in a direction parallel to said width of said cabinet between an open position and a closed position;
- a second drawer latch associated with said second drawer, said second drawer latch being movable between a first position in which said second drawer latch prevents said second drawer from being opened and a second position in which said second drawer latch allows said second drawer to be opened;
- a cover operatively connected to said cabinet, said cover being movable between an open position in which said first and second drawers may be opened and a closed position in which said cover prevents said first and second drawers from being opened; and
- a cover latch associated with said cover, said cover latch allowing said cover to be latched in its closed position.

7. A vehicle mounted storage unit as recited in claim 6 wherein said rear cabinet member comprises a rear cabinet wall.

8. A vehicle mounted storage unit as recited in claim 6 wherein each of said first and second drawer latches comprises:
- a movable latching member; and
- a spring operatively coupled to said latching member that biases said latching member in a latching position in which one of said drawers is prevented from being opened.

9. A vehicle mounted storage unit as recited in claim 6 additionally comprising a pair of cover support assemblies that cause said cover to be retained in its open position.

10. A storage unit structured to be mounted to a rear floor portion of a vehicle having a rearwardly facing cab wall, a first vehicle sidewall, a first wheel well having a portion which extends outwardly from a portion of said first vehicle sidewall, a second vehicle sidewall, a second wheel well having a portion which extends outwardly from a portion of said second vehicle sidewall, said vehicle mounted storage unit comprising:
- a cabinet shaped to be capable of being mounted to said rear floor portion of said vehicle, said cabinet having a length of at least about three feet, a width of at least about twelve inches, and a height of at least about fifteen inches, said cabinet comprising:
  - a first cabinet sidewall that is spaced from said first vehicle sidewall by at least about four inches in a direction perpendicular to said first cabinet sidewall when said cabinet is mounted to said vehicle;
  - a second cabinet sidewall spaced from said first cabinet sidewall by at least about three feet in a direction parallel to said length of cabinet, said second cabinet sidewall being spaced from said second vehicle sidewall by at least about four inches in a direction perpendicular to said second cabinet sidewall when said cabinet is mounted to said vehicle;

a rear cabinet member connected to said first and second cabinet sidewalls; and a cabinet floor member connected to said first and second cabinet sidewalls, said cabinet floor member being shaped to facilitate attachment of said cabinet floor member to said mounting structure;

a first drawer disposed in said cabinet, said first drawer being positioned within said cabinet between said first cabinet side wall and said second cabinet sidewall, said first drawer being movable in a direction parallel to said width of said cabinet, said first drawer comprising:

a first drawer sidewall;

a second drawer sidewall spaced from said first drawer sidewall of said first drawer by at least about two feet in a direction parallel to said length of said cabinet; and a front drawer wall connected to said first and second drawer sidewalls of said first drawer, said front drawer wall of said first drawer having a first side that is spaced from said first sidewall of said vehicle by at least about eight inches when said cabinet is mounted to said vehicle and a second side that is spaced from said second sidewall of said vehicle by at least about eight inches when said cabinet is mounted to said vehicle;

at least one first drawer support member that supports said first drawer, said first drawer support member supporting said first drawer so that said first drawer is movable in a direction parallel to said width of said cabinet between an open position and a closed position;

a first drawer latch associated with said first drawer, said first drawer latch being movable between a first position in which said first drawer latch prevents said first drawer from being opened and a second position in which said first drawer latch allows said first drawer to be opened;

a second drawer disposed in said cabinet and positioned below said first drawer, said second drawer being positioned within said cabinet between said first cabinet side wall and said second cabinet sidewall, said second drawer being movable in a direction parallel to said width of said cabinet, said second drawer comprising:

a first drawer sidewall;

a second drawer sidewall spaced from said first drawer sidewall of said second drawer in a direction parallel to said length of said cabinet; and a front drawer wall connected to said first and second drawer sidewalls of said second drawer, said front drawer wall of said second drawer having a first side that is spaced from said first sidewall of said vehicle by at least about eight inches when said cabinet is mounted to said vehicle and a second side that is spaced from said second sidewall of said vehicle by at least about eight inches when said cabinet is mounted to said vehicle;

at least one second drawer support member that supports said second drawer, said second drawer support member supporting said second drawer so that said second drawer is movable in a direction parallel to said width of said cabinet between an open position and a closed position;

a second drawer latch associated with said second drawer, said second drawer latch being movable between a first position in which said second drawer latch prevents said second drawer from being opened and a second position in which said second drawer latch allows said second drawer to be opened;

a cover operatively connected to said cabinet, said cover being movable between an open position in which said first and second drawers may be opened and a closed position in which said cover prevents said first and second drawers from being opened; and a cover latch associated with said cover, said cover latch allowing said cover to be latched in its closed position.

11. A storage unit as recited in claim 10 wherein said rear cabinet member comprises a rear cabinet wall.

12. A storage unit as recited in claim 10 wherein each of said first an d second drawer latches comprises:

a movable latching member; and a spring operatively coupled to said latching member that biases said latching member in a latching position in which one of said drawers is prevented from being opened.

13. A vehicle mounted storage unit as recited in claim 10 additionally comprising a pair of cover support assemblies that cause said cover to be retained in its open position.

14. A storage unit structured to b e mounted to a rear floor portion of a vehicle having a rearwardly facing cab wall, a first vehicle sidewall, a first wheel well having a portion which extends outwardly from a portion of said first vehicle sidewall, a second vehicle sidewall, a second wheel well having a portion which extends outwardly from a portion of said second vehicle sidewall, said vehicle mounted storage unit comprising:

a cabinet shaped to be capable of being mounted to said rear floor portion o f said vehicle, said cabinet having a length of at least about three feet, a width of at least about twelve inches, and a height of at least about fifteen inches, said cabinet comprising:

a first cabinet sidewall that is spaced from said first vehicle sidewall by at least about four inches in a direction perpendicular to said first cabinet sidewall when said cabinet is mounted to said vehicle;

a second cabinet sidewall spaced from said first cabinet sidewall by at least about three feet in a direction parallel to said length of cabinet, said second cabinet sidewall being spaced from said second vehicle sidewall by at least about four inches in a direction perpendicular to said second cabinet sidewall when said cabinet is mounted to said vehicle;

a rear cabinet member connected to said first and second cabinet sidewalls; and a cabinet floor member connected to said first and second cabinet sidewalls, said cabinet floor member being shaped to facilitate attachment of said cabinet floor member to said mounting structure;

a fixed tray disposed said cabinet, said fixed tray being non-movable and being located between said first cabinet side wall and said second cabinet sidewall, said fixed tray comprising:

a first tray sidewall;

a second tray sidewall spaced from said first tray sidewall by at least about two feet in a direction parallel to said length of said cabinet; and a front tray wall connected to said first and second tray sidewalls, said front tray wall having a first side that is spaced from said first sidewall of said vehicle by at least about eight inches when said cabinet is mounted to said vehicle and a second side that is spaced from said second sidewall of said vehicle by at least about eight inches when said cabinet is mounted to said vehicle;

a first drawer disposed in said cabinet below said fixed tray, said first drawer being positioned within said cabinet between said first cabinet side wall and said second cabinet sidewall, said first drawer being movable in a direction parallel to said width of said cabinet, said first drawer comprising:

a first drawer sidewall;

a second drawer sidewall spaced from said first drawer sidewall of said first drawer by at least about two feet in a direction parallel to said length of said cabinet; and a front drawer wall connected to said first and second drawer sidewalls of said first drawer, said front drawer wall of said first drawer having a first side that is spaced from said first sidewall of said vehicle by at least about eight inches when said cabinet is mounted to said vehicle and a second side that is spaced from said second sidewall of said vehicle by at least about eight inches when said cabinet is mounted to said vehicle;

at least one first drawer support member that supports said first drawer, said first drawer support member supporting said first drawer so that said first drawer is movable in a direction parallel to said width of said cabinet between an open position and a closed position;

a first drawer latch associated with said first drawer, said first drawer latch being movable between a first position in which said first drawer latch prevents said first drawer from being opened and a second position in which said first drawer latch allows said first drawer to be opened;

a second drawer disposed in said cabinet and positioned below said first drawer, said second drawer being positioned within said cabinet between said first cabinet side wall and said second cabinet sidewall, said second drawer being movable in a direction parallel to said width of said cabinet, said second drawer comprising:

a first drawer sidewall;

a second drawer sidewall spaced from said first drawer sidewall of said second drawer in a direction parallel to said length of said cabinet; and a front drawer wall connected to said first and second drawer sidewalls of said second drawer, said front drawer wall of said second drawer having a first side that is spaced from said first sidewall of said vehicle by at least about eight inches when said cabinet is mounted to said vehicle and a second side that is spaced from said second sidewall of said vehicle by at least about eight inches when said cabinet is mounted to said vehicle;

at least one second drawer support member that supports said second drawer, said second drawer support member supporting said second drawer so that said second drawer is movable in a direction parallel to said width of said cabinet between an open position and a closed position;

a second drawer latch associated with said second drawer, said second drawer latch being movable between a first position in which said second drawer latch prevents said second drawer from being opened and a second position in which said second drawer latch allows said second drawer to be opened;

a cover operatively connected to said cabinet, said cover being movable between an open position in which said first and second drawers may be opened and a closed position in which said cover prevents said first and second drawers from being opened; and a cover latch associated with said cover, said cover latch allowing said cover to be latched in its closed position.

15. A storage unit as recited in claim 14 wherein said rear cabinet member comprises a rear cabinet wall.

16. A storage unit as recited in claim 14 wherein each of said first and second drawer latches comprises:

a movable latching member; and a spring operatively coupled to said latching member that biases said latching member in a latching position in which one of said drawers is prevented from being opened.

17. A vehicle mounted storage unit as recited in claim 14 additionally comprising a pair of cover support assemblies that cause said cover to be retained in its open position.

* * * * *